United States Patent
Kaddas et al.

[19]

[11] Patent Number: 5,873,324
[45] Date of Patent: Feb. 23, 1999

[54] BIRD GUARD WIRE PROTECTOR

[76] Inventors: John G. Kaddas; Carol B. Kaddas, both of 7759 Sarto Ave., Salt Lake City, Utah 84121

[21] Appl. No.: 757,763

[22] Filed: Nov. 27, 1996

[51] Int. Cl.$^6$ ................................................. A01K 31/12
[52] U.S. Cl. ............................. 119/174; 119/537; 52/101
[58] Field of Search ................... 119/174, 537; 52/101; 174/45 R, 139

[56] References Cited

U.S. PATENT DOCUMENTS

| | | | |
|---|---|---|---|
| 4,110,943 | 9/1978 | Carlson | 52/101 |
| 4,359,844 | 11/1982 | Hoggard et al. | 52/101 |
| 4,535,197 | 8/1985 | Butler | 174/41 |
| 4,803,819 | 2/1989 | Kelsey | 52/309.1 |
| 5,293,721 | 3/1994 | Richard et al. | 52/101 |
| 5,299,528 | 4/1994 | Blankenship | 119/537 |
| 5,650,594 | 7/1997 | Urnovitz | 52/101 |

FOREIGN PATENT DOCUMENTS

405268862 A  10/1993  Japan ........................ 52/101

OTHER PUBLICATIONS

Illustration of models KE 1026–001 and KE 1026–002 Bird Guard Protector of Kaddas Enterprises, Inc.
Advertising flyer of Kaddas Enterprises, Inc. for the Model KE 1026–001 and the model KE 1026–002 Bird Guard Protector.

*Primary Examiner*—Michael J. Carone
*Assistant Examiner*—Yvonne R. Abbott
*Attorney, Agent, or Firm*—Trask, Britt & Rossa

[57] ABSTRACT

A protector is made of electrical insulating material. It has a central member sized and shaped to fit over the top of an insulator attaching a power wire to a support structure. The central member has a first connecting structure and a second connecting structure unitarily formed therewith and extending away. A first arm is connected to the first connecting structure to extend away therefrom; and a second arm is connected to the second connecting structure to extend away therefrom. The arms have apertures selectable for attachment to wires of different dimensions. The arms also have internal and external facing ribs to register with the internal and external facing ribs of the first and second connecting structures to effect a snug mechanical connection.

25 Claims, 6 Drawing Sheets

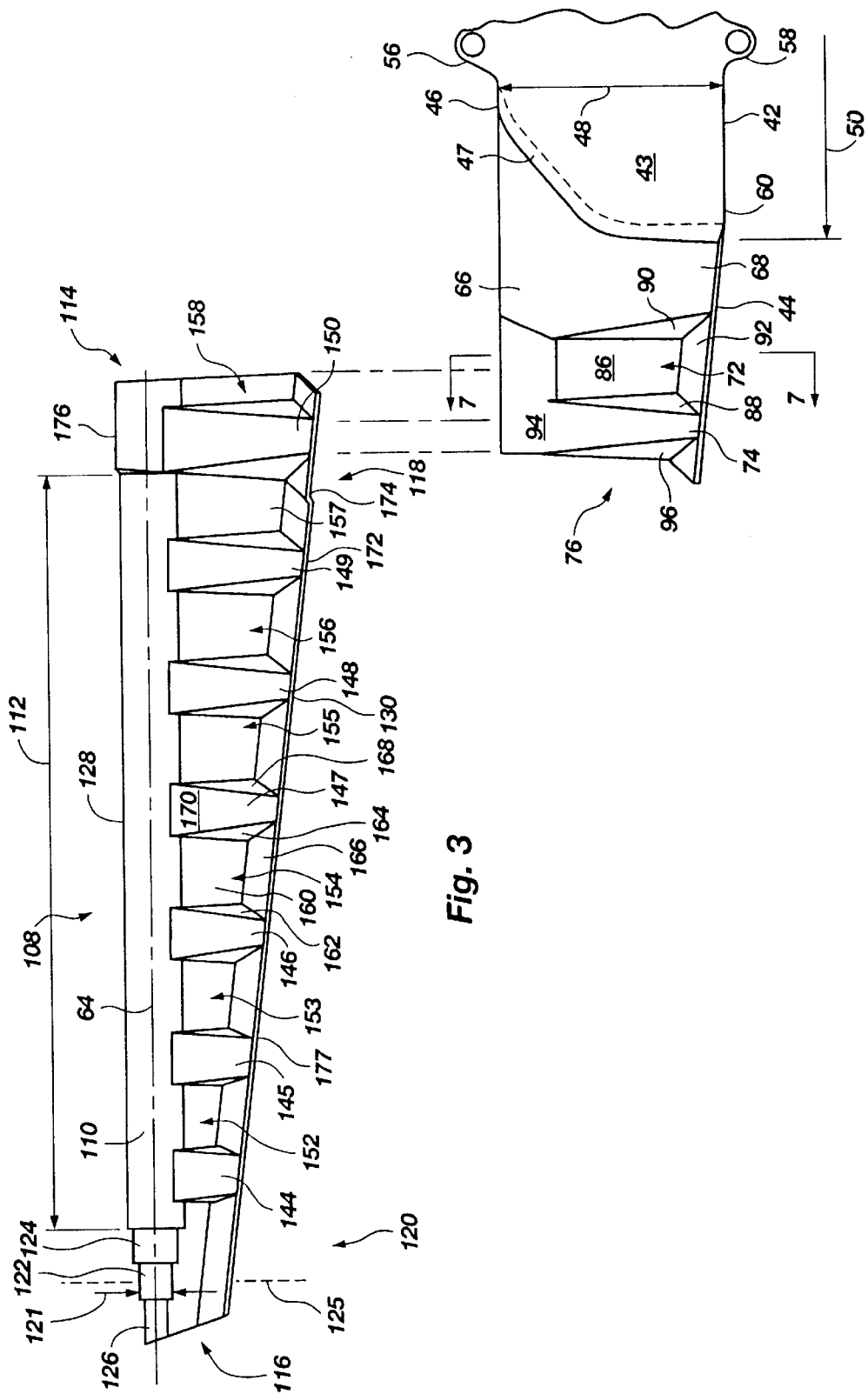

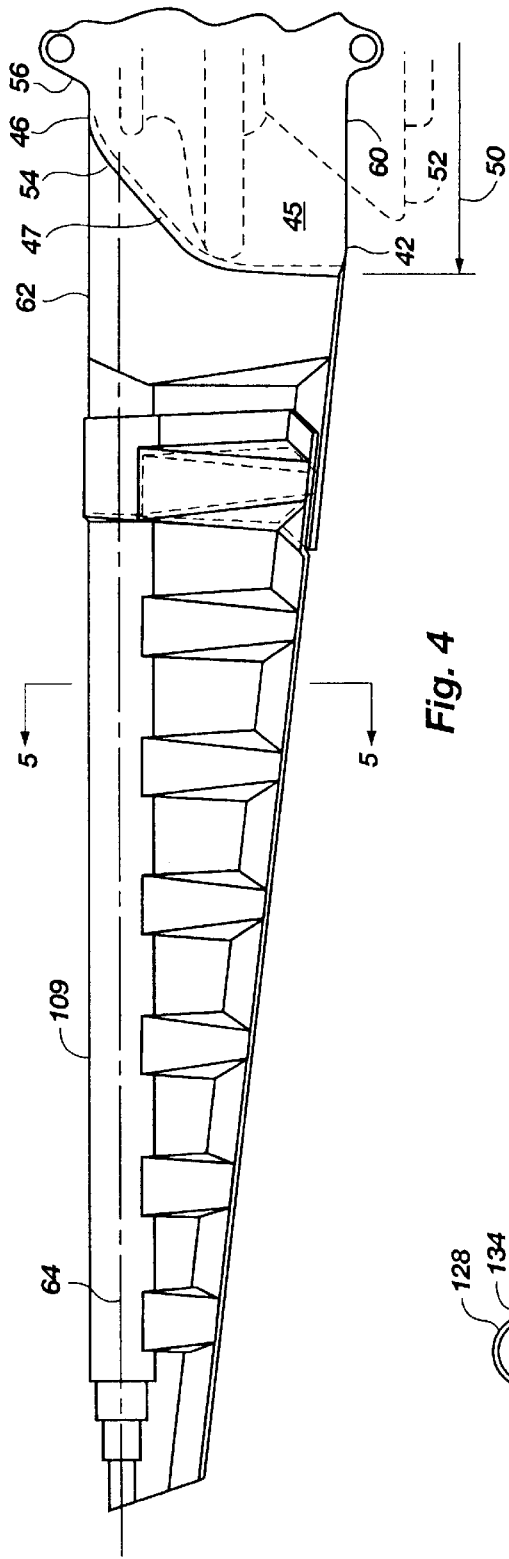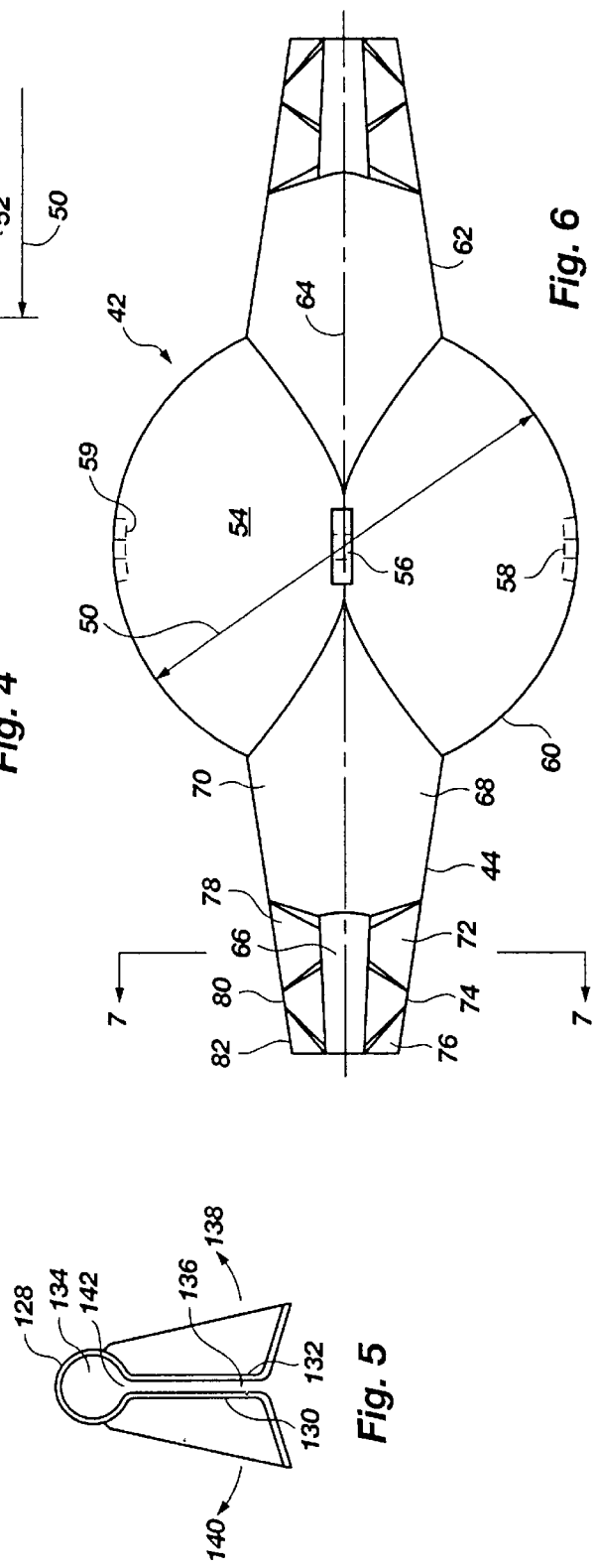

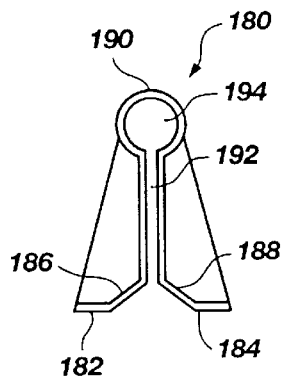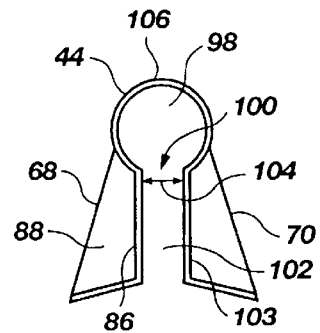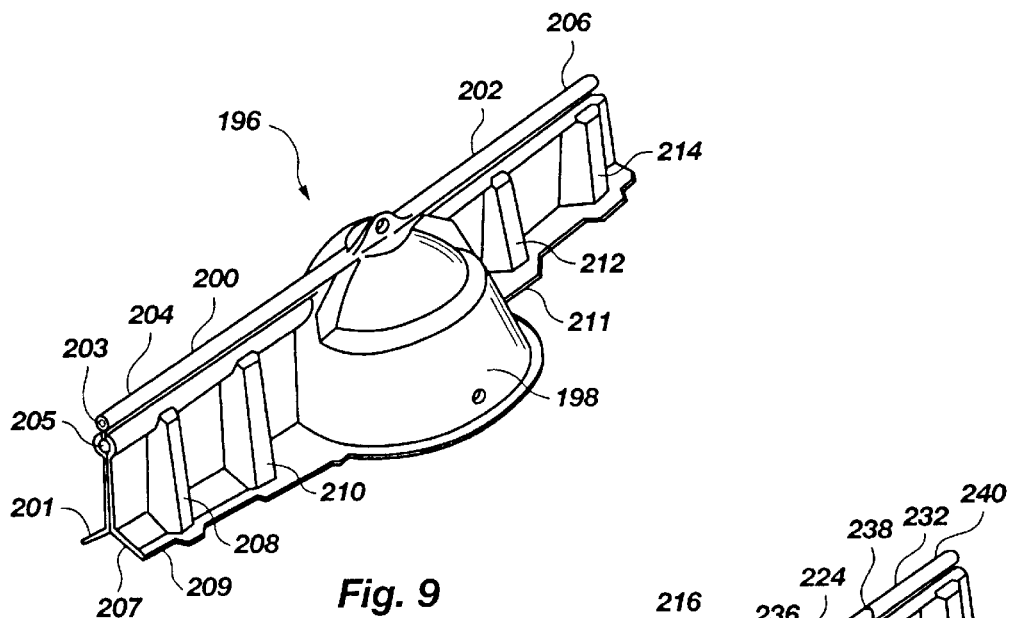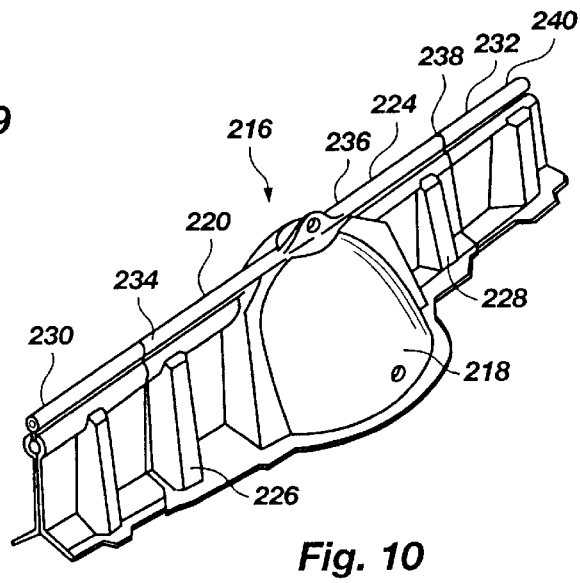

BIRD GUARD WIRE PROTECTOR

BACKGROUND OF THE INVENTION

1. Field of the Invention

This invention relates to structures positioned to protect birds from electrical contact with live electrical wires. More specifically, this invention relates to a protector for association with a support structure, such as a utility pole, to preclude electrical contact by the bird with two live electrical wires attached to the support structure.

2. State of the Art

Support structures such as utility poles are used to suspend electrical wires above the ground. The support structures are all positioned outdoors and may be of a variety of different sizes, shapes and configurations. The structures are configured to support one or more of a plurality of wires. The wires of concern are those used to transmit electrical energy or electrical power for commercial or private use and which pose a shock hazard to birds if they cause a short between two separate wires.

It is known that birds from time to time alight or perch on the support structure such as power poles. For selected birds, the wing spans are sufficient so that a bird can contact two parallel wires when taking off or landing thereby causing an electrical short and thereby injuring or killing the bird. In addition to the loss of the bird, a short can cause a power outage.

U.S. Pat. No. 5,299,528 (Blankenship) discloses a unit for use on a power pole to provide an elevated roost or perch for raptors. U.S. Pat. No. 4,359,844 (Hoggard et al.) also shows a device that is attached to the cross bar of an electrical power pole to inhibit birds from landing on the cross bar. U.S. Pat. No. 5,293,721 (Richard et al.) shows a device that is positioned on a wire to inhibit horizontal movement of small animals such as squirrels along the wire.

Kaddas Enterprises, Inc. of Salt Lake City, Utah has for some time offered a protector that has a central dish-like structure for positioning over an insulator mounted on a utility pole. The insulator is used to mount the power line or wire to the pole. Extensions are unitarily formed with the central dish-like structure to extend in opposite directions along the wire mounted to the insulator. The extensions are sized to extend a distance selected so that a large bird, such as a raptor, perching on the cross bar of the pole or on the dish-like structure would not cause a short upon extending its wings to land or take off from the perched position.

There is a need for protectors that may be used in a variety of different applications in a number of different configurations.

SUMMARY

A protector for use with an insulator associated with the attachment of a wire to an outdoor support structure includes a central member formed from electrically insulating material. The central member is sized and shaped to be snugly mechanically associated with the insulator. A first connecting structure is mechanically associated with the central member which in some embodiments is preferably formed to extend outwardly therefrom over the wire. The second connecting structure is also mechanically associated with the central member. It is spaced from the first connecting structure. The second connecting structure also extends outwardly from the central member over the wire.

The protector has a first arm with a first cover sized to substantially cover the wire extending from the insulator. The first arm is formed to have a preselected length extending away from the central member along and over the wire. The first arm has a first connecting means mechanically associated for connecting the first cover to the first connecting structure. The first arm also has second connecting means mechanically associated with the first cover different from the first connecting means for connecting the first cover to the wire. The protector also has a second arm having a preselected length to extend away from the central member.

The second arm also has a cover with first connecting means mechanically associated for connecting the second arm to the second connecting structure. Second connecting means is also mechanically associated with the second cover different from the first connecting means for connecting the second cover to extend away from the central member over the wire.

In a preferred arrangement, the first cover has a proximal end with the first connecting means of the first arm positioned proximate the proximal end. The first cover also desirably has a distal end opposite the proximal end. The second connecting means of the first arm includes a first portion positioned proximate to the distal end of the first cover.

The first portion of the second connecting means of the first arm preferably includes a plurality of apertures, each having a cross section selected for snug connection to one of a plurality of wires, each of the plurality having a different cross section. Desirably, the apertures are aligned with the smallest cross section positioned toward the distal end of the first cover and the largest cross section positioned toward the proximal end of the first cover. All but the largest aperture can be removed such as by sawing or cutting to adapt the cover for connection thereto.

The first cover is sized to have a length selected to preclude contact with the wire and an adjacent wire by the extended wings of a selected bird (such as a raptor) positioned on a support structure.

In an alternative and preferred configuration, the first connecting structure and the first connecting means of the first arm are formed to effect a male-female connection. Alternatively, the first connecting structure is formed to be one member of a male-female connection and the first connecting means of the first arm is formed to be the other member of the male-female connection.

The first cover of the first arm has a wire covering portion desirably unitarily formed with a downwardly extending first leg and a downwardly extending second leg spaced from the downwardly extending first leg. The downwardly extending first leg and second leg each are formed to have alternately externally facing and internally facing ribs formed substantially along the length of the first cover. The first cover preferably has a channel sized to receive the wire.

The first leg and the second leg both extend generally radially away from the channel spaced from each other to form a receiver for the wire. The channel is desirably elastically deformable with the first leg and the second leg connected thereto so that upon outward relative movement of the first leg and the second leg, a gap is defined which is sized to receive the wire from the receiver into the channel.

The first connecting structure associated with the central member preferably has a wire covering portion with a downwardly extending right side and a downwardly extending left side. The right side and the left side each are formed to have at least one alternating internal facing rib and external facing rib sized to mechanically associate it with a selected externally facing rib and internally facing rib of the externally and internally facing ribs of the first arm to form a mechanically snug association or connection. The wire covering portion of the first connecting structure has a channel with a slot sized to receive the wire therethrough into said channel.

In yet another alternative configuration, the central member to be formed to have a cap portion that extends over and about the insulator and preferably a cap portion that is formed with an external surface to preclude electrical contact with the wire and an adjacent wire supported by the outdoor support structure by the feet of a bird perching on the outdoor support structure including the central member.

In yet an alternative configuration, a plurality of protectors may be used on a plurality of wires supported by a support structure.

In a further alternate configuration, a protector has a central member with a first connecting structure and a second connecting structure each mechanically associated with the central member. A first arm is provided for attachment to one of the first and second connecting structures. In a preferred alternative, the other connecting structure has an interconnector spanning to and connected to one of the first and second connecting structure of a second central member. A second arm is provided to attach to the other connecting structure of the second central member.

A method of protecting a selected bird purchasing on the outdoor support structure is also disclosed in which a first protector and a second protector are positioned over separate wires mounted or supported by the outdoor support structure.

BRIEF DESCRIPTION OF THE DRAWINGS

In the drawings which illustrate what is presently regarded as the best modes for carrying out the invention:

FIG. 2 is a partial view of a central member with connecting structure of a protector of the present invention;

FIG. 3 is a side view of an arm for use with the protector of the present invention;

FIG. 4 is a partial view of an arm and a central member of FIG. 2 assembled and positioned over an insulator;

FIG. 5 is a cross-sectional view of the arm of FIG. 4 along the section line 5—5;

FIG. 6 is a top view of the central member of FIG. 2;

FIG. 7 is a cross-sectional view of the first connecting structure along section lines 7—7 of FIGS. 2 and 6;

FIG. 8 is a cross section of an alternator arm for use with the protector of the present invention;

FIG. 9 is a perspective view of an alternative central member with connecting structure of the protector of the present invention;

FIG. 10 is a perspective view of an alternative central member and alternative arm structure of a protector of the present invention;

DETAILED DESCRIPTION OF THE ILLUSTRATED EMBODIMENT

Power poles exist in a variety of configurations, sizes and shapes for supporting one or more utility wires including specifically power transmission wires. The poles are used to support the wires high above the ground. Birds have been observed landing on and perching upon the power pole, as well as on the associated cross members, wires and insulators.

Selected birds having large wing spans are vulnerable to shock and electrocution from electrical power lines. More specifically, birds of prey such as raptors (eagles, osprey, owls and so on) and other large birds such as condors, vultures and the like, all have wing spans so that the bird with wing extended can contact two adjoining power lines or wires mounted to the same power pole. That is, many power poles or support structures support two or more electrical wires. The wires although not necessarily parallel may be sufficiently proximate so that the wings of a bird can span the distance between the two wires proximate the support structure or power pole. When the bird takes off or lands, the wings are extended and may extend or present a wing span sufficient for the wings to touch and cause an electrical short between the two wires and in turn lead to a short circuit and shock or electrocution for the bird. Interruption of electrical service is also a result that may be experienced.

Figure 1:
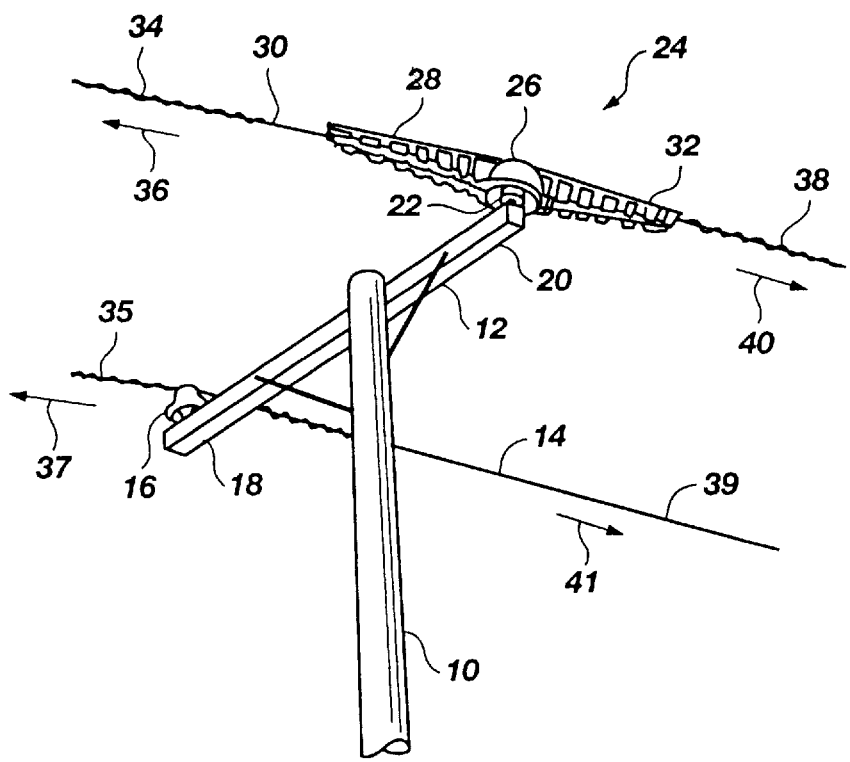
FIG. 1 is a perspective view of a support structure supporting wires attached by insulators with a protector positioned over one wire.

FIG. 1 shows support structure here in the form of a utility pole 10 having a cross bar 12 mounted near the top of the pole. A power line or first wire 14 is mounted to the pole 10 by an insulator 16. Those in the art will recognize that the insulator may be made of glass or similar insulating material. The insulator is secured by bolts or other similar structure to fasten it to the cross bar 12. The wire in turn is clamped to or by the insulator 16 to provide an electrically insulated attachment to the support structure and, more particularly, the pole 10 and cross bar 12 assembly.

In FIG. 1, the insulator 16 is shown attached to one end 18 of the cross bar 12. At the other end 20 of the cross bar 12 is another insulator 22 securely mounted thereto. A protector 24 is positioned as shown with a central member 26 positioned over the insulator 22. A first arm 28 positioned over wire 30 and a second arm 32 also positioned over the wire 30. That is, the wire 30 has a first stretch 34 extending in a first direction 36 away from the insulator 22. The wire 30 also has a second stretch 38 extending in a second direction 40 opposite to the first stretch 34 in the first direction. The wire 14 may also be said to have a first stretch 35 extending in a third direction 37 which may be in alignment with the first direction 36 or different or misaligned (not 180°) from the first direction 36.

The wire 14 also has a second stretch 39 that extends in a fourth direction 41 which may be generally either parallel to or different from the second direction 40.

Although the wire 30 and the wire 14 are shown in general alignment, and indeed substantially parallel, it should be understood that wires mounted to a support structure may extend in different directions from an insulator and need not be straight or in axial alignment.

It should also be noted that the wires 30 and 14 here shown supported by the pole 10 are substantially in the same plane or at the same elevation above the ground. Multiple cross bars may be mounted to the pole 10 at different heights with wires at different elevations. The precise configuration and orientation of the support structure, as well as the orientation of the supported wires, such as wires 14 and 30 of a plurality of wires, may vary widely as known to those in the art.

The protector 24 of FIG. 1 is further illustrated in FIG. 9, as more fully discussed hereinafter. A preferred protector is illustrated in part in FIGS. 2–7. More specifically, a central member 42 is shown in FIGS. 2, 4 and 6 with a first connecting structure 44 and a second connecting structure 62, both unitarily formed therewith and extending away therefrom. A first half 43 of the central member 42 of FIG. 6 is shown in FIG. 2; and a second half 45 is shown in FIG. 4.

The central member 42 includes a cap portion 46 which may just be an upper portion of the central member. However, in FIGS. 2, 4 and 6 the cap portion 46 is essentially the entire main component of the central member 42. The cap portion 46 is here shown to be a solid structure sized in height 48 and in width or diameter 50 to surround a selected insulator, such as the insulator 52 shown in phantom in FIG. 4. The insulator 52 here shown is one of a variety of different sizes and shapes that may be used. Different central members having caps, such as cap 46, are provided to accommodate insulators of different sizes and shapes. As can be seen, cap 46 is sized and shaped to fit snugly about the insulator 52.

As can be seen, the cap 46 has an upper surface 54 which functions as a support surface should a bird elect to perch thereupon. The cap 46 is here shown formed of an electrically insulating material such as Royal Light R87-59 ABS UV, flame retardant with dielectric strength of 570 V/mill material or other similar plastic-like materials. The cap 46 is formed to be a substantially cap-like structure, although in some selected operations it may have slots or openings to permit ventilation, to minimize use of material, or to permit manipulation by tools from the ground. Alternatively, various geometric shapes may be formed in the cap for strengthening or for access for purposes of inspection. Also interior ribs, gussets or ridges like ridge 47 may be formed unitarily for strengthening the cap 46.

The cap 46 of FIGS. 2 and 4 also has an eye 56 formed to facilitate use. More specifically, a lineman working in the field may find it convenient to attach the central member 42 to a clip or other structure attached to his person such as by a belt in order to provide a free hand environment while performing work. Alternatively, the eye 56 may be used for raising or lowering a number of central members or protectors, such as protector 24, to and from the ground surface for placement over a selected insulator. A lower eye 58 may be provided along the lower edge of the cap 46 to function similar to the eye 56. In selected applications, the lower eye 58 may have a corresponding eye 59 positioned diametrically opposite as better seen in FIG. 6. The eyes 56, 58 and 59 may also permit a user to grasp or connect to the protector from the ground using long tools suitable for such purposes.

As better seen in FIG. 6, the first connecting structure 44 is shown extending diametrically opposite the second connecting structure 62 along wire axis 64. The first connecting structure 44 has a wire covering portion. More specifically, the first connecting structure 44 has an upper section 66 which covers the wire extending from the insulator 52 in a first direction. A downwardly extending first side 68 is spaced from a downwardly extending second side 70.

The downwardly extending first side 68 has an internal facing rib 72 and an external facing rib 74 followed again by a portion of a internal facing rib 76. Similarly, the second side 70 has an internal facing rib 78 and an external facing rib 80 followed by a portion of an internal facing rib 82.

As best seen in FIG. 6, the external ribs 74 and 80 are positioned opposite each other along the axis 64. Similarly, the internal facing ribs 72 and 76 are opposite internal facing ribs 78 and 82. The ribs may be said to be symmetrically opposite each other along the axis 64 as shown. Additional internal and external facing ribs may be positioned or formed along the axis 64 of the first securing structure 44 of the central member 42 if desired.

As can be better seen in FIG. 2, an internal facing rib, such as rib 72, has an inside face 86 and two side faces 88 and 90. The rib 72 also has a lower surface or base 92. An adjacent external rib 74 has an external face 94 and is formed using the side face 88 of the adjacent internal rib 72, as well as the side face 96, of the next adjacent internal rib which is here a portion of the internal rib 76.

The ribs 78, 80 and 82 of the second side 70 are similarly formed.

As can be seen from the cross section of FIG. 7, a portion of the first connecting structure 44 with the ribs 72, 74, 76, 78, 80 and 82 as described is formed with a channel 98 sized to receive a plurality of different diameter wires therethrough along the wire axis 64. The channel 98 has a slot 100 formed in its sidewall to receive the wire therethrough into the channel 98 from a receiver portion 102 defined by the interior wall 86 of the first internal facing rib 72 of the first side 68 and the corresponding internal wall 103 of the first internally facing rib 78 of the second side 70.

The first connecting structure, is formed out of electrical insulating material and preferably a plastic-like material similar to that hereinbefore described which, in turn, is elastically deformable upon relative movement of the first side 68 outwardly relative to the second side 70 to increase the cross-sectional dimension or width 104 of the gap 100 to receive wire therethrough to retain the wire upon relative movement of the first side 68 toward the second side 70 upon release of the force necessary to effect the relative movement. In other words, the sides 68 and 70 may be spread apart to receive a wire through the receiver 102 and through the gap 100 into the channel 98. In operation, this can be effected in some embodiments by placing the receiver 102 over the wire and pushing downwardly from the top.

Referring again to FIG. 6, the second connection structure 62 can be seen to virtually be the same as the first connection structure 44 but configured to extend in the opposite direction. Thus, the second connection structure may be said to be a mirror image of the first connection structure 44.

In practice, it has been found preferable to form the central member 42 with the first connection structure 44 and the second connection structure 62 as a single unitary piece. However, alternative configurations in which the first connection structure 44 and the second connection structure 62 are attached, such as by plastic welding, by adhesives, or even by mechanical connections involving nuts, bolts, screws and the like, may all be employed in selected applications.

Referring now to FIG. 3, a first arm 108 is shown. It has cover structure 110 sized to substantially cover a wire such as wire 14 or wire 30 extending away from an insulator such as insulator 52. The first arm 108 is formed to have a preselected length 112. As hereinbefore discussed, the length 112 is selected so that for selected birds, such as raptors, condors, eagles, vultures and the other birds with large wing spans, a protector with a first arm 108 and a second arm 109 mounted over an associated insulator extends a distance so that the bird can take off and land from the support structure, including any cross members, such as cross member 12 (including the insulator covered with the central member), without wing contact with two wires, such as adjacent wires 14 and 30, to create an electrical short and impose a shock upon the bird. The length 112 may be, for example, from as low as two feet to more than four feet.

The first arm 108 has first connecting means mechanically associated with the first cover 110 for connecting the first cover 110 to the first connecting structure 44 associated with the central member. The first arm 108 also has a second connecting means for connecting the first cover 110 to the wire, such as wire 30 and, more particularly, the first stretch 34 of the wire 30.

The second arm 109 is substantially identical in shape and dimension as the first arm 108 for mounting to the second connection structure 62 shown in FIG. 6. Indeed, a first arm 108 may be used for and as the second arm 109. However, the second arm 109 may be sized and shaped and dimensioned different from the first arm 108. However, it is here contemplated that two similar arms 108 and 109 will be attached to the central member 42.

Notably, the first cover 110 has a proximal end 118 and a distal end 120. The first connecting means of the first arm 108 is positioned proximate the proximal end 118 of the first cover 110. The second connecting means of the first arm 108 includes a first portion positioned proximate the distal end 120 of the first cover.

The first portion of the second connecting means of the first arm 108 is here shown to include a plurality of apertures 122, 124 and 126. Each aperture 122, 124, 126 of the plurality of apertures has a cross section selected for snug connection of one wire of a plurality of wires, each of the wires having a differing cross section. As can be seen in FIG. 3, the first portion of second connecting means is in effect a series of stepped-in-size apertures, each increasing in diameter from the outward or distal end 120 to the largest diameter oriented towards the proximal or internal end 118.

In practice, the user observes the diameter of the wire to which the first arm 108 and the second arm 109 are to be attached. Two arms 108 and 109 are then taken and adapted for mounting to those wires. That is, the distal end 120 can be modified by cutting, for example, along plane 125, to present the cross section or diameter 121 of the aperture 122, which is larger than the diameter 126. Similarly, a cut could be effected to present the cross section or diameter of the aperture 124 or as many other apertures as provided to use the arms 108 and 109 with wires of different dimensions. In other words, the user may adapt the first portion of the second connecting means of the first arm 108 for snug connection to the wire.

The first arm is formed of an electrically insulating material such as that hereinbefore described. The first cover 110 of the first arm 108 has a wire covering portion 128 which is unitarily formed with a downwardly extending first leg 130 and a downwardly extending second leg 132 spaced from a downwardly extending first leg. It can also be seen that the wire covering portion of the first arm 108 has a channel 134 sized to receive the wire. The downwardly extending left leg 130 and the downwardly extending right leg 132 both extend generally radially away from the channel 134 and are spaced from each other to form a receiver 136 for the wire. The channel 134 and, more particularly, the wire covering portion 128 of cover 110, is preferably formed of an elastically deformable material and is unitarily connected to the first leg 130 and the second leg 132 so that upon outward 138, 140 relative movement of the first leg 130 and the second leg 132 a gap 142 is defined. That is, the channel 134 functions as a hinge for the first leg 130 and the second leg 132 and also as a spring to urge the legs 130 and 132 inwardly to drop and retain the wire in the channel 134. The gap 142 is sized to receive the wire from the receiver 136 into the channel 134.

FIG. 5 shows the arm 108 in a simplified static condition. That is, the apertures 110 are not shown for clarity. It can be seen that, in the static condition as illustrated, the wire is positioned within the channel 134 and is snugly secured therein absent a force to urge the first leg 130 and second leg 132 outwardly 138 and 140. Inasmuch as the first leg 130 and second leg 132 are formed so that in an at-rest condition they appear as generally illustrated in FIG. 5, it can be seen that the first leg and the second leg together with the apertures 122, 124 and 126, all function separately and together as a second securing means or as another portion of the second securing means to attach the first cover 110 and, in turn, the first arm 108, to the wire, such as wire 14 or wire 30.

It can also be seen that the first leg 130 and the second leg 132 each are formed to have alternatively externally facing and internally facing ribs substantially along the length of the first cover 128. More particularly, it can be seen that the first leg 130 has externally facing ribs 144 through 150 and internally facing ribs 152 through 157 and a partial internally facing rib 158. Each rib as shown is formed with an interior face 160 and side faces 162 and 164, as well as a bottom 166. The external facing ribs, such as rib 147, have side faces 164 and 168 and an external face 170. It can be seen that the bottom face 172 of the arm has a step proximate the last external rib 150.

The second leg 132 is formed as a mirror image of the first leg 130 so that it, too, has corresponding externally facing ribs and internally facing ribs with ribs that mirror the rib 150 and the partial rib 158 to correspond to and connect with the internally facing rib 78, externally facing rib 80 and partial internally facing rib 82 of the second side 70 of the first connecting structure 44.

The last external rib 158, as well as the related portion 176 of the cover 128, are together sized to fit over and snugly to the corresponding external rib 74, the internal rib 72 and partial internal rib 76, as generally depicted by the proximate relationship of FIGS. 2 and 3 and more fully illustrated in FIG. 4. That is, the external rib 158 and adjoining internal rib 157 and partial internal rib 150 are sized to mechanically, snugly and frictionally attach by pushing the portion 176 of the cover 110 downwardly.

It may also be noted that in FIG. 3, the lower surface 177 of the arm 108 tapers upwardly from the proximal end 114 toward the distal end 116 to reduce the cross section and in turn the wind resistance and in turn the forces on the protector, the insulator and the wire. Further, the embodiment of FIGS. 3 and 4 is shown with ribs such as ribs 144 and 152 which provide structural strength while reducing the thickness of the material and in turn leading to savings in material.

Turning now to FIG. 8, an alternative first arm or second arm 180 is shown in which the first leg 182 and the second leg 184 are configured with a surface 186 and 188 to facilitate positioning of the first arm on the wire. That is, before installation, the first arm 180 may be positioned on top of the wire with the wire typically being round. The adjacent surfaces 186 and 188 are angled to align the wire and direct it toward the receiver 192. Thereafter, the user presses downward on the first cover 190 of the alternative first or second arm 180 to urge the wire into receiver 192 and into the channel 194.

Turning now to FIG. 9, an alternative central member 196 is shown with a cap 198 sized and configured for an insulator 16 or 22 which is of dimension and shape different from that shown in FIG. 4. It may be noted that the first connecting structure 200 and second connecting structure 202 are here sized and shaped with reenforcing ribs 204 and 206 positioned along the upper portion of the first connecting structure 200 and second connection structure 202. The reinforcing ribs 204 and 206 may be cylinders or cylindrical with a slot 203 facing into wire receiving channel 205. With the slot 203, the reinforcing ribs act as a spring and a hinge for the legs 207 and 201.

It may also be noted that the first connecting structure 200 has two externally facing ribs 208 and 210 on one side 209 and two on the other or opposite side not shown. Similarly, the second connecting structure 202 has externally facing ribs 212 and 214 on one side 211 and two on the other side (not shown) to provide for an alternative securing arrangement with a respective first arm and a respective second arm (not shown) in FIG. 9. That is, the respective arms not here shown may be similar to arms 230 and 232 (FIG. 10). The arms may be configured to fit over all the ribs or just some of the ribs of the first and second connecting structures 200 and 202.

Turning now to FIG. 10, a central member 216 has a cap 218 sized for snugly fitting over an insulator of a shape and dimension different from that shown for the cap 198 of FIG. 9, as well as the cap of FIG. 4. The first securing structure and second securing structure 220 and 224, respectively, each have multiple externally facing ribs, such as externally facing ribs 226 and 228, in a pattern on opposite sides comparable to that shown for the central member 42 of FIGS. 2, 4 and 6. The first arm 230 is formed with first connecting means having externally facing ribs and internally facing ribs to effect a connection comparable to a connection discussed with respect to FIGS. 2–7. The second arm 232 is identical and comparable in size and shape to the first arm 230 and similarly has connecting means proximate the proximal end thereof to interconnect to the second connecting structure 224 in a manner comparable to that disclosed and discussed with respect to the structure of FIGS. 2–7. Alternatively, the arms 230 and 232 may be formed to fit over all the externally facing ribs to enhance the mechanical association It may be noted with respect to FIG. 10, that the reenforcing rib 234 of the first connecting structure is comparable to rib 204 of FIG. 9 and is cut and removed in order to provide for a snug fit between the first arm 230 and first connecting structure 220. Similarly, the upper supporting rib 236 of the second connecting structure is removed. The arm with its rib 240 extends to the junction 238 shown in FIG. 10.

Figure 11:
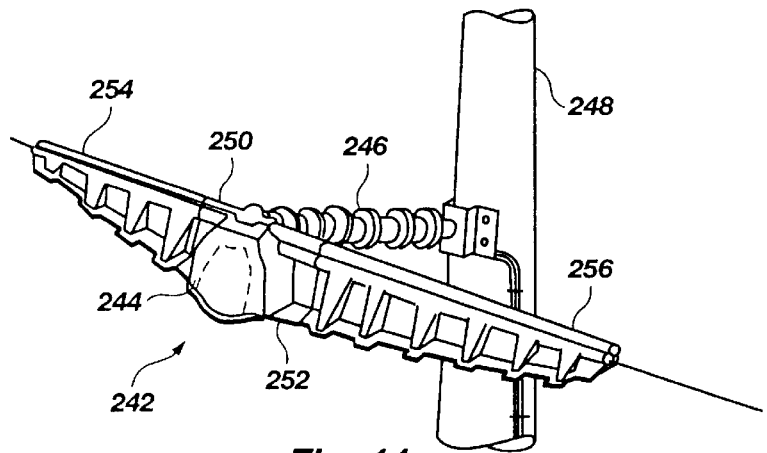
FIG. 11 shows an alternative configuration of a protector of the present invention in perspective associated with an insulator extending outwardly from a support structure.
Figure 12:
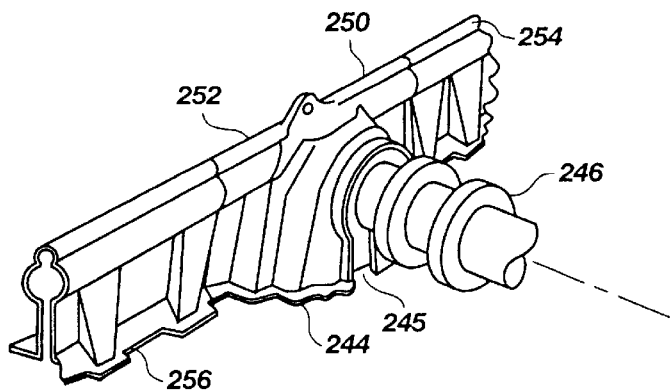
FIG. 12 shows a portion of the structure of the protector of FIG. 11 in an alternative perspective orientation.
Figure 13:
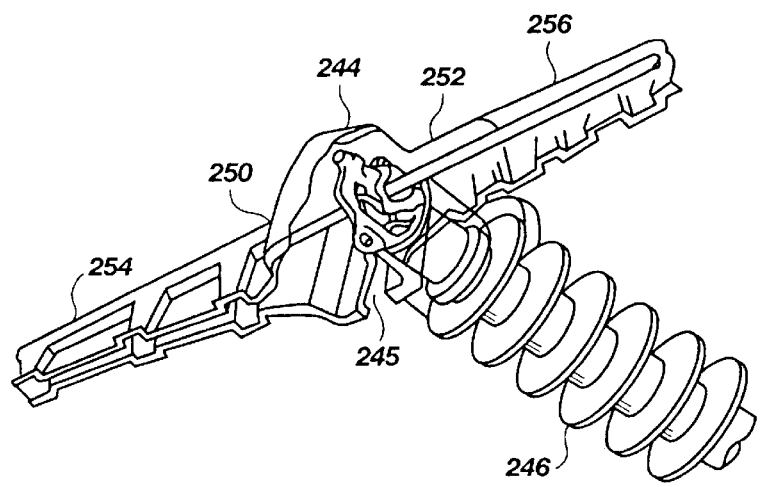
FIG. 13 shows the protector of FIGS. 11 and 12 in partial cutaway perspective associated with an insulator.

Referring now to FIGS. 11, 12 and 13, an alternative form of a protector 242 is shown configured for mechanical association with an insulator 246 extending outwardly or generally sideways from the support structure 248. The protector 242 has a central member 244, as well as a first connecting structure 250 and a second connecting structure 252. Similarly, it has a first arm 254 and a second arm 256, each configured to mechanically connect to the first connecting structure and the second connecting structure as generally illustrated in a manner similar to that described for the structures of FIGS. 2–7. Notably, the central member is formed with a slot 245 sized to provide for a secure snap fit of the central member onto the insulator 246.

Figure 14:
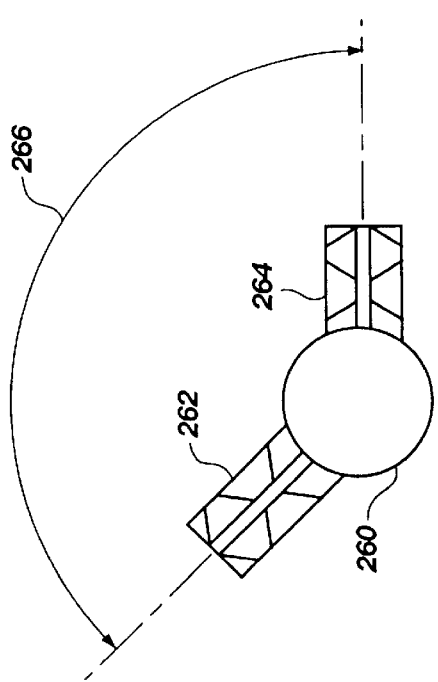
FIG. 14 is a graphical illustration of an alternative configuration of an insulator of a central member of a protector of the present invention.

Referring now to FIG. 14, a central member 260 is shown with a first connecting structure 262 and a second connecting structure 264 unitarily formed therewith to extend away therefrom but not opposite each other. The connecting structures 262 and 264 define an obtuse angle 266 selected for a particular installation. Arms such as the first arm 108 may be connected to the first connecting structure 262 and the second connecting structure 264 to provide a complete protector.

Figure 15:
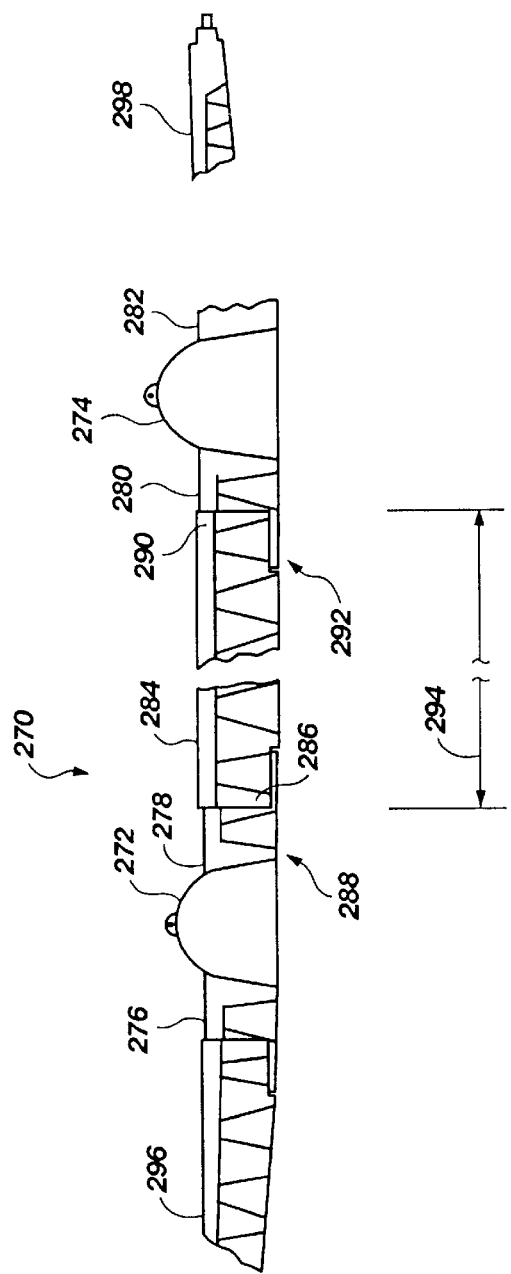
FIG. 15 is an alternate simplified side view of an alternate embodiment.

In FIG. 15, an alternate protector 270 is shown having a first central member 272 and a second central member 274 comparable to any selected control member herein disclosed. The first central member 272 has first connecting structure 276 and second connecting structure 278. The second central member 274 also has first connecting structure 280 and second connecting structure 282. A spanning member 284 is provided with a cover to cover the wire between two insulators on two cross members attached to the same power pole. The spanning member 284 has a connecting arrangement 286 on one end 288 to connect to the connecting structure 278 of the first central member 272 and a connecting arrangement 290 at the other end 292 to connect to the connecting structure 280 of the second control member 274. The spanning member 284 is sized in length 294 as necessary so that it will extend between two proximate parallel cross members on a power pole with a common wire extending between in-line insulators. That is some power poles provide two cross members for strength or for other reasons known in that industry. A protector for such a configuration has the spanning member 284 preferably formed with a cover, connection structure and ribs comparable to those discussed hereinbefore with respect to FIGS. 2–6. The spanning member 284 may be formed so that it may be cut (or sawed) along its length so that it may be sized on site. A first arm 296 and second arm 298 are provided for connection to appropriate connecting structures 276 and 282 respectively.

As hereinbefore stated, the protectors disclosed are preferably made of electrically insulating material of sufficient thickness to provide the desired insulation and structural strength. The plastic arms and central members are desirably formed by thermo-forming processes, including vacuum molding. Other materials and methods of manufacture may be used as desired.

It should be understood that the first arm, such as first arm 108, may be used as a second arm so that a utility person or lineman need only carry an inventory of first arms and an inventory of selected central members for the different insulators that will be encountered. Therefore, the user may inventory all the parts necessary to effect assembly of protectors for positioning over the insulators on a power pole by simply snapping together or forcing together the first arm with the first connecting structure and a second arm, which is the same as the first arm, to the second connecting structure and thereafter snapping the entire structure over the top of the wire extending in a first direction and a second direction away from the insulator. For a particular support structure, a protector is positioned on each wire carrying sufficient electrical power to harm a bird, particularly a raptor or other large bird as hereinbefore discussed.

What is claimed is:

1. A system for protecting insulators associated with the attachment of wires to outdoor support structures, said system comprising:

central members each formed from electrically insulating material and each of a different size and shape to be snugly mechanically associated with one of a plurality of insulators associated with the attachment of a wire to an outdoor support structure;

first connecting structure mechanically associated with each of said central members;

second connecting structure mechanically associated with each of said central members and spaced from said first connecting structure of its corresponding central member;

a first arm having a first cover sized to substantially cover a wire extending away from one of said insulators in a first direction, said first arm being formed of electrically insulating material and to have a preselected length, said first arm having first connecting means mechanically associated with said first cover for removably connecting said first cover to one of said first connecting structure and said second connecting structure of each of said central members and second connecting means mechanically associated with said first cover different from said first connecting means for connecting said first cover to said wire; and a second arm having a second cover sized to substantially cover a wire extending away from one of said insulators in a second direction, said second arm being formed of electrically insulating material and to have a preselected length, said second arm having first connecting means mechanically associated for removably connecting said second arm to the other of said first connecting structure and said second connecting structure of each of said central members and second connecting means mechanically associated with said second cover spaced from said first connecting means for connecting said second cover to said wire.

2. The protector of claim 1, wherein said first cover has a proximal end and wherein said first connecting means of said first arm is positioned proximate the proximal end of said first cover.

3. The protector of claim 2, wherein said first cover has a distal end opposite the proximal end, and wherein the second connecting means of said first arm is positioned proximate the distal end of said first cover.

4. The protector of claim 2, wherein said first connecting structure and said first connecting means of said first arm are formed to effect a mechanically snug hand-and-glove-like connection.

5. The protector of claim 4, wherein said first cover of said first arm is formed with a wire covering portion unitarily formed with a downwardly extending first leg and a downwardly extending second leg spaced from said downwardly extending first leg.

6. The protector of claim 5, wherein said wire covering portion has a channel sized to receive said wire, wherein said downwardly extending left leg and said downwardly extending right leg both extend generally radially away from said channel spaced from each other to form a receiver for said wire.

7. The protector of claim 6, wherein said channel is elastically deformable and connected to said left leg and said right leg so that upon outward relative movement of said downwardly extending left leg and said downwardly extending right leg to define a gap sized to receive said wire from said receiver into said channel.

8. The protector of claim 1, wherein the second connecting means of said first arm includes a plurality of apertures each having a cross section selected for snug connection to one of a plurality of wires each of differing cross section, said plurality of apertures being formed with all but the largest in cross section of said plurality of apertures being removable, and wherein the said plurality of apertures are aligned with the smallest cross section positioned toward the distal end of said first cover and with the largest cross section positioned toward the proximal end of said first cover.

9. The protector of claim 1, wherein said first connecting structure is formed to extend outwardly from said central member in said first direction and said second connecting structure is formed to extend outwardly from said central member in said second direction.

10. The protector of claim 9, wherein said first connecting structure is formed to be one member of a hand-and-glove-like connection, and wherein said first connecting means of said first arm is formed to be the other member of said hand-and glove-like connection.

11. The protector of claim 10, wherein said downwardly extending first leg and said downwardly extending second leg each are formed to have alternating externally facing and internally facing ribs substantially along the length of said first cover.

12. The protector of claim 11, wherein said first connecting structure is formed to have a wire covering portion with a downwardly extending first side and a downwardly extending second side spaced from said downwardly extending first side.

13. The protector of claim 12, wherein said downwardly extending first side and said downwardly extending second side of said first connecting structure are each formed to have at least one alternating internal facing rib and external facing rib each sized to mechanically associate with a selected externally facing rib and internally facing rib of the externally and internally facing ribs of said first cover to form a mechanically snug association.

14. The protector of claim 13 wherein said wire covering portion of said first connecting structure has a channel with a slot sized to receive said wire, and wherein said first connecting structure has a downwardly extending first side and a downwardly extending second side spaced from said first side to receive said wire therebetween.

15. The protector of claim 1 wherein said central member includes a cap portion that extends over and about said insulator.

16. The protector of claim 1 wherein said central member includes a cap portion having an external surface formed to preclude electrical contact with the wire supported by the insulator by the feet of a bird perching on said outdoor support structure including the said central member.

17. The protector of claim 1, wherein said first arm and said second arm are interchangeable.

18. The protector of claim 1, wherein said first arm is the same as said second arm.

19. The system of claim 1 wherein one of said central members is formed to be snugly and mechanically associated with a first insulator and another of said central members is formed to be snugly and mechanically associated with a second insulator, said second insulator being sized different from said first insulator.

20. The system of claim 1 wherein said first arm and said second arm are sized different from each other.

21. The system of claim 1 wherein one of said central members is formed to be snugly and mechanically associated with a first insulator and another of said central members is formed to be snugly and mechanically associated with a second insulator, said second insulator being shaped different from said first insulator.

22. The system of claim 1 wherein said first arm and said second arm are shaped different from each other.

23. A protector for use with an insulator associated with the attachment of a wire to an outdoor support structure, said protector comprising:

a central member formed from electrically insulating material and sized and shaped to be snugly mechanically associated with an insulator associated with the attachment of a wire to an outdoor support structure;

first connecting structure mechanically associated with said central member;

second connecting structure spaced from said first connecting structure mechanically associated with said central member;

a first arm having a first cover sized to substantially cover a wire extending away from said insulator in a first direction, said first arm being formed of electrically insulating material and to have a preselected length, said first arm having first connecting means mechanically associated with said first cover for connecting said first cover to one of said first connecting structure and said second connecting structure and second connecting means mechanically associated with said first cover different from said first connecting means for connecting said first cover to said wire; and a second arm having second cover structure sized to substantially cover a wire extending away from said insulator in a second direction, said second arm being formed of electrically insulating material and to have a preselected length, said second arm having first connecting means mechanically associated for connecting said second arm to the other of said first connecting structure and said second connecting structure and second connecting means mechanically associated with said second cover spaced from said first connecting means for connecting said second cover to said wire; and a spanning member for spanning from said central member to a second central member positioned proximate to said central member, said spanning member being sizeable to extend between said central member and said second central member and having cover structure sized to substantially cover a wire extending therebetween, said spanning member being formed of electrically insulating material, and said spanning member having first connecting means and second connecting means mechanically associated for connecting said spanning member to the other of said first connecting structure and said second connecting structure of said first central member and to said second central member.

24. A protector for use with proximately positioned insulators associated with the attachment of a wire to an outdoor support structure, said protector comprising:

a first central member formed from electrically insulating material and sized and shaped to be snugly mechanically associated with a first insulator associated with the attachment of a wire to an outdoor support structure;

a second central member formed from electrically insulating material and sized and shaped to be snugly mechanically associated with a second insulator associated with the attachment of a wire to an outdoor support structure, said second insulator being spaced from and proximate to said first insulator;

first connecting structure mechanically associated with said first central member;

second connecting structure spaced from said first connecting structure mechanically associated with said first central member;

third connecting structure mechanically associated with said second central member;

fourth connecting structure spaced from said first connecting structure mechanically associated with said second central member;

a first arm having first cover sized to substantially cover a wire extending away from said insulator in a first direction, said first arm being formed of electrically insulating material and to have a preselected length, said first arm having first connecting means mechanically associated with said first cover for connecting said first cover to one of said first connecting structure and said second connecting structure and second connecting means mechanically associated with said first cover spaced from said first connecting means for connecting said first cover to said wire;

a second arm having second cover structure sized to substantially cover a wire extending away from said second insulator in a second direction, said second arm being formed of electrically insulating material and to have a preselected length, said second arm having first connecting means mechanically associated for connecting said second arm to one of said third connecting structure and said fourth connecting structure and second connecting means mechanically associated with said second cover spaced from said first connecting means for connecting said second cover to said wire; and a spanning member sizeable to extend between said first central member and said second central member and having cover structure sized to substantially cover a wire extending therebetween, said spanning member being formed of electrically insulating material, and said spanning member having first connecting means and second connecting means mechanically associated for connecting said spanning member to the other of said first connecting structure and said second connecting structure of said first central member and to the other of said third connecting structure and said fourth connecting structure of said second central member.

25. A protector for use with an insulator associated with the attachment of a wire to an outdoor support structure, said protector comprising:

a central member formed from electrically insulating material and sized and shaped to be snugly mechanically associated with an insulator associated with the attachment of a wire to an outdoor support structure;

first connecting structure mechanically associated with said central member sized to extend away therefrom and configured to receive therein a first wire extending away from the insulator in a first direction;

second connecting structure mechanically associated with said central member sized to extend away therefrom, said second connecting structure being spaced from said first connecting structure and configured to receive therein a second wire extending away from the insulator in a second direction;

a first arm having a first cover sized to substantially cover one of the first wire and the second wire extending away from said insulator, said first arm being formed of electrically insulating material and to have a preselected length, said first arm having first connecting means mechanically associated with said first cover for removably connecting said first cover to one of said first connecting structure and said second connecting structure to have one of said first wire and said second wire extending therethrough into said first cover and second connecting means mechanically associated with said first cover different from said first connecting means for connecting said first cover to the said one of said first wire and said second wire extending into said first cover; and a second arm having a second cover sized to substantially cover the other of the first and the second wire extending away from said insulator, said second arm being formed of electrically insulating material and to have a preselected length, said second arm having first connecting means mechanically associated with said first cover for removably connecting said second cover to the other of said first connecting structure and said second connecting structure to have the other of said first wire and said second wire extending therethrough into said second cover and second connecting means mechanically associated with said second cover spaced from said first connecting means for connecting said second cover to the said one of said first wire and said second wire extending into said second cover.

* * * * *